(12) United States Patent
Vohra

(10) Patent No.: US 7,774,761 B2
(45) Date of Patent: Aug. 10, 2010

(54) USE OF MEMORY WATCH POINTS AND A DEBUGGER TO IMPROVE ANALYSIS OF RUNTIME MEMORY ACCESS ERRORS

(75) Inventor: Tanuj Vohra, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 11/306,391

(22) Filed: Dec. 27, 2005

(65) Prior Publication Data

US 2007/0150872 A1    Jun. 28, 2007

(51) Int. Cl.
G06F 9/44 (2006.01)
G06F 11/00 (2006.01)

(52) U.S. Cl. .................. 717/130; 717/124; 717/128; 714/35

(58) Field of Classification Search .............. None
See application file for complete search history.

(56) References Cited

U.S. PATENT DOCUMENTS

| 5,842,019 | A | 11/1998 | Kolawa et al. | |
| 5,987,626 | A * | 11/1999 | Greyzck | 714/38 |
| 6,105,148 | A | 8/2000 | Chung et al. | |
| 6,311,327 | B1 * | 10/2001 | O'Brien et al. | 717/114 |
| 6,351,845 | B1 | 2/2002 | Hinker et al. | |
| 6,618,824 | B1 | 9/2003 | Hastings | |
| 6,634,020 | B1 | 10/2003 | Bates et al. | |
| 6,658,653 | B1 | 12/2003 | Bates et al. | |
| 7,395,458 | B2 * | 7/2008 | Shrivastava et al. | 714/47 |
| 2003/0061597 | A1 | 3/2003 | Curtis et al. | |
| 2004/0015876 | A1 | 1/2004 | Applin | |

FOREIGN PATENT DOCUMENTS

CN    1188933 A    7/1998

* cited by examiner

*Primary Examiner*—Lewis A Bullock, Jr.
*Assistant Examiner*—Mark A Gooray
(74) *Attorney, Agent, or Firm*—Cuenot, Forsythe & Kim, LLC

(57) ABSTRACT

A method of analyzing runtime memory access errors in a computer program can include instrumenting the computer program with runtime analysis code and detecting a runtime memory access error of the instrumented computer program. The method further can include, responsive to detecting the runtime memory access error, dynamically setting a watch point.

9 Claims, 2 Drawing Sheets

```
int *a;            // declare a pointer to an integer
a=(int *)malloc(20 * sizeof(int));   // allocate space for 20 integers as an array on the heap
a[21]=5;           // access the 22$^{nd}$ element of the array of integers
```

FIG. 1

```
1  #include <stdio.h>
2  #include <stdlib.h>
3
4  int main()
5  {
6    int size_of_mem;
7    int *array = (int *)calloc(20,sizeof(int));
8    array[5] = 5;
9    free(array);
10   size_of_mem = (5 + *(array + 5));
11   printf("\nSize of memory is: %d\n", size_of_mem);
12   return 0;
13 }
```

FIG. 2

```
FMR: Free memory read
    This is occurring while in:
        main     [hello.c:10]
        _start   [crt1.o]
    Reading 4 bytes from 0x93dbc in the heap.
    Address 0x93dbc is 20 bytes into a freed block at 0x93da8 of 80 bytes.
    This block was allocated from:
        malloc   [rtlib.o]
        calloc   [rtlib.o]
        main     [hello.c:7]
        _start   [crt1.o]
    There have been 0 frees since this block was freed from:
        free     [rtlib.o]
        main     [hello.c:9]
        _start   [crt1.o]
```

FIG. 3

USE OF MEMORY WATCH POINTS AND A DEBUGGER TO IMPROVE ANALYSIS OF RUNTIME MEMORY ACCESS ERRORS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to software development and, more particularly, to runtime memory analysis of a computer program.

DESCRIPTION OF THE RELATED ART

Many modern programming languages do not support programming constructs that prevent runtime memory access errors. Runtime memory access errors can include, but are not limited to, reading or writing from uninitialized memory, reading or writing beyond the bounds of a defined array, memory leaks, free memory access, and the like. One example of a modern programming language that does not support constructs to prevent such actions is the C or C++ programming language. When a program written in C or C++ is compiled, runtime memory access errors, such as the ones noted above, typically go undetected.

In illustration, within C/C++, it is possible for a developer to define an array of a particular size and then access elements beyond the size of that array. Consider the exemplary code shown in FIG. 1. As shown, the access of a[21] is to a portion of memory that was not allocated by the program and, therefore, may either be unallocated memory on the heap or memory that was allocated by another piece of the program. Such an action is illegal, but typically goes undetected by conventional C/C++ compilers.

Some runtime analysis tools, however, such as those that utilize Object Code Insertion (OCI) technology, can detect these sorts of errors. OCI is a technology that inserts checking instructions within the object files of a computer program. A program that has such checking instructions inserted therein is referred to as an instrumented program. The checking instructions implement various monitoring and/or tracking functions relating to memory usage. The checking instructions can be inserted between instructions of the program that reference memory, i.e. to monitor read and write operations as well as memory allocations and de-allocations.

It would be beneficial to extend the functionality of runtime analysis tools in relation to the detection of runtime memory access errors.

SUMMARY OF THE INVENTION

The embodiments disclosed herein provide methods and articles of manufacture relating to runtime memory analysis of a computer program. One embodiment of the present invention can include a method of analyzing runtime memory access errors in a computer program. The method can include storing user-specified attributes specifying conditions for setting a watch point, instrumenting the computer program with runtime analysis code, and detecting a runtime memory access error of the instrumented computer program. The method further can include determining context information for the runtime memory access error, comparing the context information with the user-specified attributes, and, responsive to detecting the runtime memory access error, dynamically setting a watch point in accordance with the user-specified attributes when the context error information matches the user-specified attributes.

Another embodiment of the present invention can include a method of analyzing runtime memory access errors in a computer program including storing a user-specified instruction specifying a plurality of attributes comprising an error type attribute, a stack trace attribute, and a restart flag specifying conditions for setting a watch point, detecting a runtime memory access error in the computer program, determining context information for the runtime memory access error, and comparing the context information with user-specified attributes. If the context information matches the user-specified attributes, a watch point can be automatically set for the computer program in accordance with the user-specified attributes.

Yet another embodiment of the present invention can include a machine readable storage device, having stored thereon, a plurality of code sections for causing the machine to perform the various steps and/or functions disclosed herein.

BRIEF DESCRIPTION OF THE DRAWINGS

There are shown in the drawings, embodiments which are presently preferred, it being understood; however, that the invention is not limited to the precise arrangements and instrumentalities shown.

FIG. 1 depicts exemplary source code which is useful for understanding the embodiments disclosed herein.

FIG. 2 is exemplary source code which is useful for understanding the embodiments disclosed herein.

FIG. 3 is example output produced by a runtime analysis tool relating to the error illustrated with reference to FIG. 2.

DETAILED DESCRIPTION OF THE INVENTION

Figure 4:
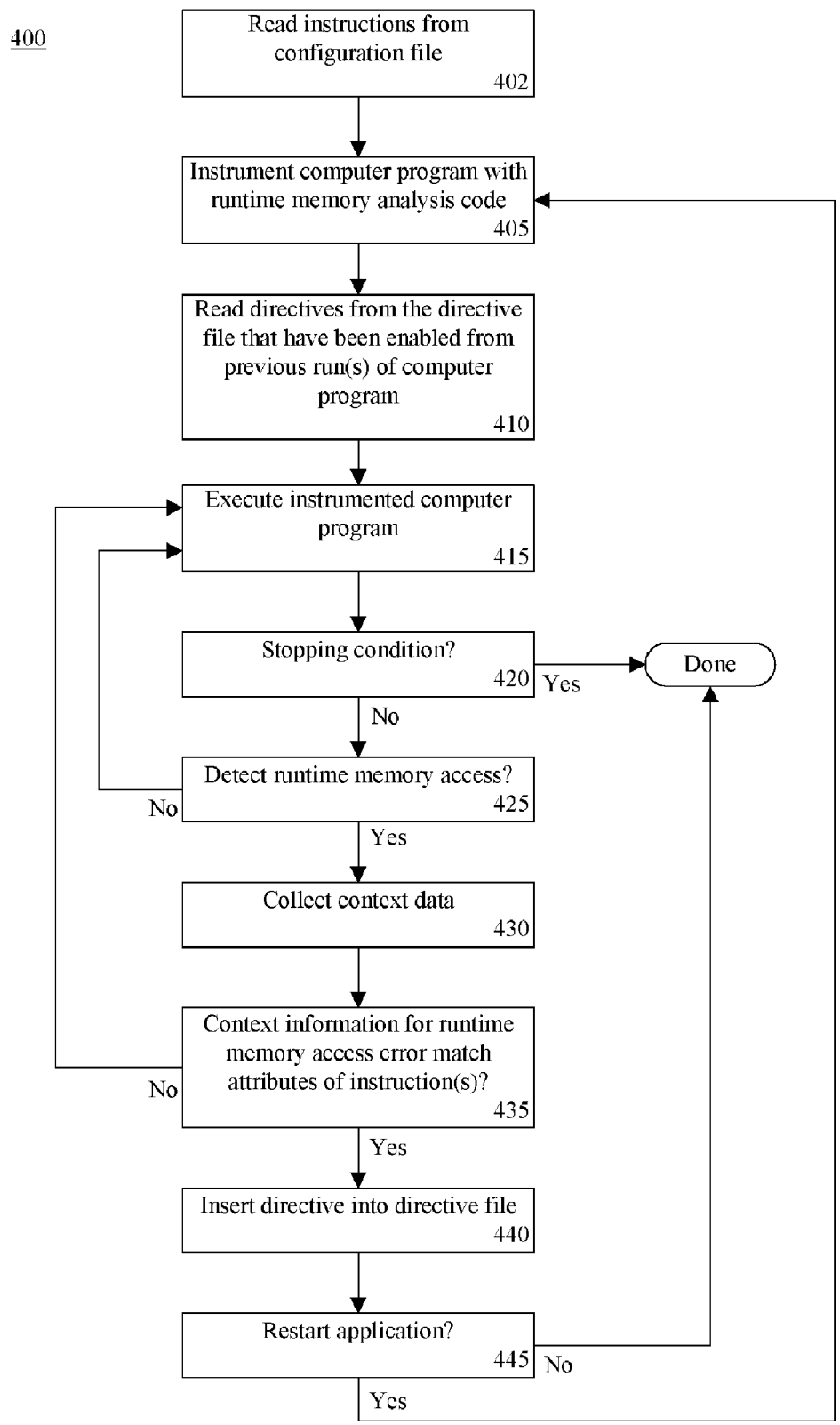
FIG. 4 is a flow chart illustrating a method of runtime memory analysis in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein provide a technique for dynamically setting watch points in a computer program. In accordance with the inventive arrangements disclosed herein, various conditions can be established by a user or developer. If the conditions are met, a watch point can be dynamically created. Further, one or more programmatic actions can be automatically performed when the established conditions are met and the watch point is created.

The various functions described herein can be implemented using a software analysis tool. In one embodiment, for example, the various functions described herein can be implemented as extensions of one or more members of the Rational PurifyPlus family of software analysis tools which are commercially available from International Business Machines Corporation of Armonk, N.Y. (IBM). PurifyPlus is a family of computer programs that provide runtime analysis functionality to software developers and testers. In general, runtime analysis refers to the practice of understanding application behavior using data collected during execution of a program under test. The various development activities that can be analyzed using PurifyPlus can include, but are not limited to, memory corruption detection and memory profiling in native C/C++ applications, memory profiling in Java and .NET managed code applications, performance profiling to identify slow or inefficient portions of code, code coverage analysis, and runtime tracing.

The product(s) disclosed herein are intended to provide a basis for teaching one skilled in the art to better understand the inventive arrangements disclosed herein. It should be appreciated, however, that the present invention can be implemented as a standalone application, as part of a larger application, or in virtually any appropriately detailed structure, computer program, and/or portion thereof.

FIG. 2 is exemplary source code which is useful for understanding the embodiments disclosed herein. Executing the program illustrated in FIG. 2 using a runtime analysis tool as described herein would result in the detection of a "Free Memory Read" (FMR) error being reported at line 10. A runtime memory access error of the type FMR refers to the situation in which the array has been freed prior to being accessed.

FIG. 3 is example output produced by a runtime analysis tool relating to the error illustrated with reference to FIG. 2. Among the different items of context information provided about the runtime memory access error, the output indicates stack trace information. The stack trace information indicates that the memory block was allocated using a call to "malloc" originating within "calloc", which was called from "main", which in turn was called from "_start".

In accordance with one embodiment of the present invention, this context information can be used to dynamically create and/or set a watch point. More particularly, the context information can be compared to one or more attributes of user-specified information, i.e. an instruction. The user-specified attributes indicate the circumstances under which a watch point is dynamically created. If the context information matches the user-specified attributes, then the watch point can be automatically set. Further one or more programmatic actions can be performed as may be specified by the attributes.

A watch point refers to a monitoring program or function which is capable of indicating when a specified datum, or portion of memory, changes. Watch points in Purify, for example, are implemented by monitoring the addresses of the loads and stores performed by the program when executed. Purify can report the exact cause and result of each memory access relating to reads, writes, allocations, frees, coming into scope at function entry, and going out of scope at function exit.

In one embodiment of the present invention, the user-specified attributes can be included within a configuration file of the runtime analysis tool. With respect to Purify, for example, an instruction can be included within a configuration file which indicates the particular circumstances under which a watch point is automatically created or invoked as the case may be.

An example of such an instruction can be watch_on_error<error type> <stack trace> <re-start flag>. This instruction, when placed into a configuration file in the case of Purify, causes a watch point to be set or invoked for the circumstances indicated by the parameters of the instruction. The <error type>attribute specifies a particular type of memory access error that will cause the watch point functionality to be invoked. Possible runtime memory access errors that can be specified for this attribute can include, but are not limited to, free memory read errors, free memory write errors, memory leak errors, uninitialized memory read errors, array bound read errors, array bound write errors, and the like. The list of different types of runtime memory access errors is provided for purposes of illustration only. As such, the embodiments disclosed herein are not intended to be limited by the examples provided. It should be appreciated that any type of runtime memory access error that the OCI tool is capable of identifying can be used as a possible value for the error type attribute.

The next attribute in the instruction, the <stack trace> attribute, can specify the stack trace information that is to be detected from a runtime memory access error in order to invoke the watch point. For example, the stack trace information of the instruction can indicate that the next time a call to malloc is detected which was called from calloc, which was called from main, which was called from _start, a watch point is automatically set, assuming the other conditions of the instruction also are met. The <re-start flag> attribute specifies whether the program under test is to be restarted when the watch point is invoked. In another embodiment, a further attribute can be provided which indicates whether the program is to be restarted in a debugger as well as the particular debugger to be used when the watch point is set.

Thus, when a runtime memory access error is detected, information collected from the runtime analysis tool, i.e. the context information illustrated with reference to FIG. 3, can be compared with the user-specified instruction included in the configuration file. If the context information for the detected runtime memory access error matches the attributes of the instruction, a watch point corresponding to the matched instruction can be automatically created. With reference to the Purify runtime analysis tool, a directive specifying the attributes extracted from the context information or the instruction, as the case may be, can be inserted into the directive file. As noted, the program under test optionally can be restarted with or without a debugger as specified by the instruction attributes. The directive will cause a watch point to be invoked in accordance with the parameters of the directive.

FIG. 4 is a flow chart illustrating a method 400 of runtime memory analysis in accordance with one embodiment of the present invention. Method 400 can begin in a state where one or more instructions of the variety discussed herein have been inserted into a configuration file of a runtime analysis tool such as Purify, for example. As noted, the attributes of the instruction(s) can specify the circumstances under which watch point functionality is to be invoked or set.

Accordingly, method 400 can begin in step 402 where the instructions from the configuration file are read. In step 405, an OCI-based runtime analysis tool can instrument a computer program with runtime memory analysis functions. For instance, Purify instruments the program to automatically intercept every memory access as part of its dynamic error detection. One or more calls to runtime routines, which are part of a runtime analysis library of functions not originally part of the program under test, can be inserted into the program. These functions can be inserted at locations within the program including, but not limited to, function entry and/or exit points to monitor for the various types of memory accesses described herein. In step 410, the runtime analysis tool can read any directives from the directive file that have been enabled from one or more previous runs of the computer program under test. Memory access monitoring can be implemented with respect to the identified directives.

In step 415, the instrumented program can be executed. In step 420, a determination can be made as to whether a stopping condition has been encountered. For example, the program can terminate naturally, encounter a fatal fault or a breakpoint, or the like. If no stopping condition has been encountered, the method can proceed to step 425. In step 425, a determination can be made as to whether a runtime memory access error has been encountered. If not, the method can loop back to step 415 to continue execution. If a runtime memory access error has been detected, the method can proceed to step 430.

In step 430, context information can be collected by the OCI tool. For example, information such as the function and/or module that caused the runtime memory access error can be determined as well as the particular memory address (es) that were accessed. Stack trace information specifying a call chain leading to the function responsible for the runtime memory access error also can be identified as well as the type of memory access error that is detected.

In step 435, a determination can be made as to whether the detected runtime memory access error conforms to the attributes of one or more of the instructions specified in the configuration file. For example, a comparison can be made between the context information collected in step 430 and one or more user-specified attributes of the user-specified instruction(s). A comparison can be performed between the type of runtime memory access error detected and the one specified in the instruction(s), the function responsible for causing the runtime memory access error and the one specified in the instruction(s), and/or the stack trace information or call chain detected and the stack trace or call chain specified in the instruction. If the detected runtime memory access error conforms to, or matches, the attributes specified in one of the instructions in the configuration file, the method can proceed to step 440. If not, the method can loop back to step 415 to continue execution.

It should be appreciated that one or more of the attributes discussed herein relating to the directive can be omitted from the instruction or specified as wildcards. For example, a developer can omit the function responsible for causing the runtime memory access error or specify the attribute as a wildcard. In either case, the instruction indicates that the responsible function is irrelevant to whether a watch point is triggered. The watch point will be dynamically set if the other parameters are met regardless of the particular function that caused the runtime memory access error. The resulting watch point will, for example, monitor for a particular type of memory access error irrespective of the function that triggered the error. Similarly, the type of runtime memory access error can be omitted or specified as a wildcard. In that case, for example, any sort of runtime memory access error triggered by a particular function and/or call chain as specified by the instruction can be identified such that a watch point configured to monitor accesses by the indicated function is implemented.

In any case, in step 440, the watch point can be dynamically set or created. A directive specifying the parameters of the user instruction, and therefore the context information, can be inserted into the directive file. For example, if the instruction was "watch_on_error FMM foo;*1", this instruction specifies that if a free memory mismatch (FMM) error is detected in a function named "foo", a watch point should be dynamically set. The "*" wildcard indicates that the function "foo" can be called from anywhere. The attribute "1" indicates that the program is to be restarted using a particular debugger that can be specified elsewhere by the developer. The resulting watch point command, or directive, that can be inserted into the directive file can take the form of purify_watch_n(<address-of-array>, <size-of-array>, "rw"), which tells the runtime analysis tool to watch the memory at the addresses for any read, write, and/or free accesses.

Accordingly, in step 445, one or more programmatic actions specified in the instruction can be performed automatically. For example, the program can be restarted automatically if specified in the instruction. Further, if so indicated by the instruction, the program can be restarted within a user-specified debugger. That is, the debugger can be launched automatically and the program can be loaded and executed automatically.

When the program restarts, the newly created watch point becomes active and monitors memory accesses for the target memory location(s) and/or by the target function(s). Runtime memory access information can be collected and stored for further analysis and/or otherwise made available to the user.

The method disclosed herein represents one embodiment of the present invention and, as such, is not intended to limit the present invention in any way. Other embodiments of the present invention, as may be contemplated by those skilled in the art also are within the scope of the present invention. As one example, the application of programming practices such as multi-threading, object-oriented programming, and the like, may result in different ones of the steps being performed concurrently, in a different order than presented, or altered in some other fashion. Such differences, however, do not depart from the spirit of the present invention.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A method of analyzing runtime memory access errors in a computer program comprising:
    storing user-specified instructions comprising attributes that specify conditions for creating and setting a watch point, wherein the attributes comprise at least an error type attribute and a restart flag;
    instrumenting the computer program with runtime analysis code, wherein the instrumented computer program is selectively restarted based on the restart flag;
    detecting a runtime memory access error of the instrumented computer program;
    determining context information for the runtime memory access error;
    comparing the context information with the user-specified attributes; and
    responsive to detecting the runtime memory access error, dynamically creating and setting a watch point in accordance with the user-specified attributes when the context error information matches the user-specified attributes.

2. The method of claim 1, wherein the context information comprises a type of detected runtime memory access error and the attributes comprise a user-specified type of runtime memory access error, said comparing step further comprising comparing the type of detected runtime memory access error with the user-specified type of runtime memory access error.

3. The method of claim 1, wherein the context information comprises stack trace information for the detected runtime memory access error and the attributes comprise user-specified stack trace information, said comparing step further comprising comparing the stack trace information for the detected runtime memory access error with the user-specified trace information.

4. A method of analyzing runtime memory access errors in a computer program comprising:
    storing a user-specified instruction comprising a plurality of attributes specifying conditions for creating and setting a watching point, wherein the plurality of attributes comprise an error type attribute, a stack trace attribute, and a restart flag, wherein the computer program is selectively restarted based on the restart flag;
    detecting a runtime memory access error in the computer program;
    determining context information for the runtime memory access error;
    comparing the context information with user-specified attributes, wherein the context information comprises stack trace information for the detected runtime memory access error and said comparing step further comprises comparing the stack trace information for the detected runtime memory access error with the user-specified stack trace information; and
    if the context information matches the user-specified attributes, automatically creating and setting a watch point for the computer program in accordance with the user-specified attributes.

5. The method of claim 4, wherein the context information comprises a type of detected runtime memory access error, said comparing step further comprising comparing the type of detected runtime memory access error with the user-specified type of runtime memory access error.

6. The method of claim 4, further comprising instrumenting the computer program with runtime analysis code.

7. A machine readable storage, having stored thereon a computer program having a plurality of code sections comprising:
    code for storing user-specified instructions comprising attributes specifying conditions for creating and setting a watch point, wherein the attributes comprise at least an error type attribute and a restart flag;
    code for instrumenting a computer program with runtime analysis code, wherein said instrumented computer program is selectively restarted based on the restart flag;
    code for detecting a runtime memory access error of the instrumented computer program;
    code for determining context information for the runtime memory access error;
    code for comparing the context information with the user-specified attributes; and
    code responsive to detecting the runtime memory access error, for dynamically creating and setting a watch point in accordance with the user-specified attributes when the context error information matches the user-specified attributes.

8. The machine readable storage of claim 7, wherein the context information comprises a type of detected runtime memory access error and the attributes comprise a user-specified type of runtime memory access error, said code for comparing further comprising code for comparing the type of detected runtime memory access error with the user-specified type of runtime memory access error.

9. The machine readable storage of claim 7, wherein the context information comprises stack trace information for the detected runtime memory access error and the attributes comprise user-specified stack trace information, said code for comparing further comprising code for comparing the stack trace information for the detected runtime memory access error with the user-specified stack trace information.

* * * * *